United States Patent [19]

Hargrave et al.

[11] 4,219,050
[45] Aug. 26, 1980

[54] THERMAL INSULATION METHOD AND MEANS

[76] Inventors: Harold M. Hargrave, 310 Granger Rd., Wayland, N.Y. 14572; Rohn J. Anderson, 15 Foxhill La., Camillus, N.Y. 13031

[21] Appl. No.: 12,388

[22] Filed: Feb. 15, 1979

[51] Int. Cl.$^2$ .............................................. F16L 59/10
[52] U.S. Cl. .................................... 138/97; 138/105; 138/149; 29/402.08
[58] Field of Search ................... 138/97, 99, 105, 149; 29/402.08, 401; 264/36; 427/140, 142

[56] References Cited

U.S. PATENT DOCUMENTS

| | | | |
|---|---|---|---|
| 2,007,969 | 7/1935 | Grodsky | 138/105 |
| 2,997,071 | 8/1961 | May | 138/105 |
| 3,359,351 | 12/1967 | Bender | 138/149 X |
| 3,380,258 | 4/1968 | Young | 138/149 X |
| 3,418,399 | 12/1968 | Ziegler | 138/105 X |
| 3,616,516 | 11/1971 | Corriston | 138/97 X |
| 3,753,284 | 8/1973 | Olsen et al. | 138/97 X |

*Primary Examiner*—Richard E. Aegerter
*Assistant Examiner*—James E. Bryant, III

*Attorney, Agent, or Firm*—Stonebraker, Shepard & Stephens

[57] ABSTRACT

Thermal insulation, and method of applying the same, for steam lines or other conduits carrying fluid at temperatures differing from the ambient air or ground temperatures, the structure and the method being useful in new construction and especially in replacement of deteriorated insulation in old construction. A trough-like supporting structure (e.g., the lower half of an original circular casing containing the conduit and original deteriorated insulation) is coated with a permanently flexible waterproof coating, then a body of foamed insulating material is built up on this coating, to encompass the conduit, then a permanently flexible waterproof coating is applied over the body of foamed insulation to join in sealing relation to the waterproof coating previously applied to the supporting structure. Details are given of preferred materials, and of preformed thermal insulation preferably applied to the conduit before the body of foamed insulation is formed, to protect the foamed insulation from possible excessive temperature in the conduit above that for which the foamed insulation is rated.

12 Claims, 1 Drawing Figure

U.S. Patent     Aug. 26, 1980     4,219,050
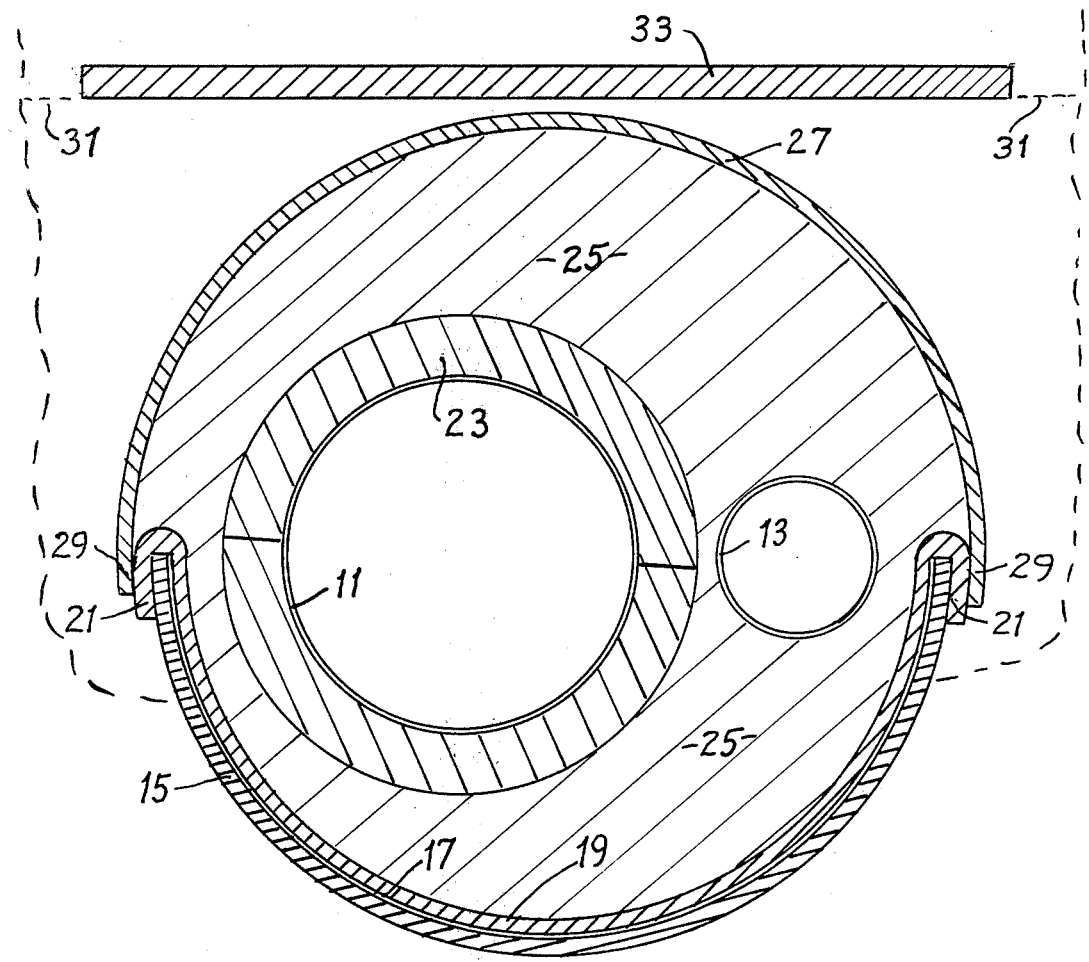

THERMAL INSULATION METHOD AND MEANS

BACKGROUND OF THE INVENTION

This invention relates to the provision of thermal insulation, especially but not exclusively for steam supply lines or other conduits carrying controlled temperature fluids, whether liquid or gas. Also, the invention is useful especially but not exclusively in the replacement of deteriorating insulation previously used on such conduits, although many aspects of the invention are applicable also to the original installation of insulation in new construction and are not confined to replacement of deteriorating insulation.

Many college campuses, suburban industrial complexes, and the like, have central steam generating plants and extensive steam distribution systems running underground from the steam plant to buildings where steam is required for heating or other purposes, often at a great distance from the steam plant. For reasons of economy, it is essential that there be good efficient insulation surrounding the steam line or conduit. There are throughout the country a great many steam distribution systems which were installed many years ago, and the insulation of which has gradually deteriorated over the years, due to moisture, to freezing, to old age, or to a combination of these or other factors, the deterioration reaching a point where the insulation is not efficient and allows too much loss and waste of heat in the steam distribution system.

An object of the present invention is the provision of an economical method and means for replacing the deteriorated insulation of a steam distribution system or a conduit system for conducting any hot fluids.

Another object of the invention is the provision of a thermal insulation method and means which may be used effectively and efficiently in providing insulation for new installations at the time they are first constructed, the invention not being limited in its usefulness to replacement of deteriorated insulation, although the invention is especially useful and advantageous for such replacement.

BRIEF DESCRIPTION OF THE DRAWING

The single view is a cross section through a typical installation, illustrating a preferred form of the present invention.

DESCRIPTION OF THE PREFERRED EMBODIMENT

A typical steam distribution system is illustrated in the drawing, in cross section. It comprises a steam line or conduit 11, having a diameter of, for example, 8 inches, and a condensate return line or conduit 13, having a diameter for example of 4 inches, running alongside and parallel to the steam line, both being enclosed in a cylindrical outer casing having a diameter, for example, about twenty or twenty two inches, the lower half of which casing is shown at 15. In the original installation, as typically constructed some years ago, this outer casing would have extended completely around the steam line and the return line, in a complete circle, and the space within the casing would have been filled with a body of thermal insulation around the steam line and in certain instances the return line, which thermal insulation, in the intervening years, has seriously deteriorated to such extent that it is no longer sufficiently efficient, and there is an unacceptably large loss of heat from the steam line. Various materials of the prior art were used, of course, for the filling of thermal insulation, and for the cylindrical casing. A typical casing material frequently used in past years, and with which we are here concerned, is the material known as Ric-Wil, found in a great many steam distribution systems constructed some years ago.

The casing, with its contained steam line and return line and insulation, is normally buried in the ground, at varying depth depending upon topography. When sections of old installations are dug up and examined today, it is found that in many cases cracks or breaks have occurred in the casing over the years, allowing moisture or water to seep in, which is the cause or one of the cases of the serious deterioration already mentioned above.

According to the present invention, the deteriorated insulation is replaced in the following manner. First, a trench must be dug to obtain access to the buried line to be repaired or renewed. It is not necessary to dig out material from beneath the line, as there is no need to disturb the lower half of the casing 15, but the trench must extend down to uncover completely the entire upper half of the casing, and be wide enough to enable cutting tools to operate on the casing.

Next, cutting tools are used to cut the casing longitudinally at each side, on the horizontal diametrical line, cutting through the casing material of Ric-Wil or whatever material was used for the outer casing when the line was originally constructed. Ric-Wil is a brand name for a tough metal casing which was widely used when steam lines were constructed some years ago.

After the longitudinal cuts have been made, the top half of the casing is removed and discarded. The old and deteriorated filling of thermal insulating material is also removed and discarded. The inner surface of the remaining lower half (approximately semi-circular cross section) of the casing is thoroughly cleaned to remove all oil, grease, and dirt, and any interior projections or weld splatters are ground relatively smooth. Then the entire area is sand blasted to what is called a "near white blast" and the clean surface is dusted and all sand, rust flakes, and other residue removed.

Then a primer is preferably coated onto the inner surface of the bottom half of the casing, as indicated at 17. In some cases, the primer may be omitted, but it gives a better foundation for the coating which is to follow, and it is preferred to use it. When the primer is used, it is preferably an epoxy primer, applied to a thickness of preferably approximately 2 mils, and preferably applied not more than four hours after completion of the sand blasting operation, to minimize any recontamination of the surface after sand blasting.

While various materials may be used for the primer, the preferred material is the epoxy primer available on the market under the name Uni-clad Hi-temp epoxy primer. It may be applied by spray, by brush, or by roller, but preferably it is applied by spraying by means of conventional spray equipment available on the market.

After the primer coating 17 is applied, an elastomeric waterproof coating is applied over the primer coating, as indicated at 19, or is applied directly to the casing 15 in those situations where no primer is used. This elastomeric waterproofing coating is one which will form a permanently flexible waterproof membrane, these characteristics being important in keeping moisture away from the newly supplied insulating filling mentioned below. The fact that the coating is elastomeric and permanently flexible has the advantage that if the casing 15 bends or deforms due to settlement of the earth or other causes, or if small cracks develope in this casing 15, the elastomeric coating will nevertheless continue to supply a continuous unbroken waterproof membrane which will not become fractured or cracked as a result of small cracks in or reasonable deformation of the outer casing.

This elastomeric waterproof coating is applied to a thickness of not less than 22 dry mils, applied as a single coat by spraying. This minimum thickness of 22 mils is found to be quite satisfactory. For the sake of economy, the maximum thickness should be not much more than this, say for example not more than about 25 mils in the dry state but there is no objection to a somewhat thicker coating except the extra cost of the unnecessarily thick coating.

Any permanently flexible elastomeric waterproofing material capable of being sprayed or otherwise suitably applied may be used. A material which has been found to be particularly suitable is a two component sprayable elastomer butyl rubber in liquid form that cationically polymerizes to form a permanently flexible waterproof membrane, such a product being available on the market under the name Elastron 860X Gray, from United Coatings, Inc., of Spokane, Washington, and adheres excellently to the primer.

Conventional spraying equipment suitable for application of the elastomer coating 19 is available on the market. One suitable form of such spraying equipment is what is known as a Graco Bulldog Hydra-spray unit.

In applying this waterproof elastomer coating 19, the coating is preferably carried up over the top edge of the casing 15 (that is, the edge formed when the casing was cut longitudinally for the purpose of removing the upper half thereof) and is extended around the top edge and a slight distance of a few inches down the outside surface of the casing, as indicated at 21. The purpose of this is to ensure a perfect watertight seal with another portion of elastomeric waterproofing coating which will be applied later after the foamed insulation material has been applied, as further mentioned below. The same type of spray equipment above mentioned as suitable for applying a waterproofing coating 19, 21 is also suitable for applying the primer coating 17.

Fiberglass insulation of appropriate thickness is applied around the steam line 11. If the steam line is intended to operate at a temperature of approximately 350 degrees Fahrenheit, as customary in many steam distribution systems, then this fiberglass insulation, shown at 23 in the drawing, preferably has a thickness of 1½ inches. With a steam line at the temperature mentioned, this thickness of fiberglass insulation is sufficient to enable the use of foamed urethane insulation surrounding the fiberglass insulation, with a service rating of 300 degrees Fahrenheit. If the steam line is to operate at a temperature higher than 350 degrees, thicker fiberglass insulation may be used around the steam line, or a different grade of foamed urethane may be used, rated for service at higher than 300 degrees.

The fiberglass insulation is preferably applied in the form of preformed semi-cylindrical sections with an internal diameter fitting snuggly against the external diameter of the steam line. Such fiberglass insulating members designed especially to fit around pipes are available on the market.

Fiberglass insulation is preferred around the steam line, because fiberglass retains its thermal insulating efficiency over a long period of time, without appreciable deterioration, if held in its original shape without sagging to the extent that certain parts of the fiberglass blanket become very thin. It is held in the original shape, of uniform thickness around the entire circumference of the steam line, by the subsequently applied urethane foam, as described below. Under conditions where a somewhat less efficient thermal insulation installation may be tolerated, it may be possible to substitute other insulating layers around the steam line, before applying the urethane foam, but as above stated the fiberglass insulation is considered the preferred material according to the present invention.

After the steam line has been covered with the desired layer of insulation material such as the fiberglass above mentioned, then the final body or mass of insulation material is applied, below and above and all around the steam line 11 and the condensate return line 13. This main body of insulation material, indicated in general at 25 in the drawing, is preferably a special grade of urethane foam having a nominal density of approximately 3 pounds per cubic foot, and a closed cell content of approximately 90 percent. That is, approximately 90 percent of the cells of the cellular structure are individual cell which are closed and do not communicate with other cells. The preferred grade of urethane also has, upon hardening, a compression resistance of approximately 630 pounds per square inch in a direction perpendicular to the foam rise, and a compression resistance of approximately 900 pounds per square inch in a direction parallel to the foam rise.

A urethane foam material having these desired characteristics and satisfying the requirements of the present invention is available on the market under the name Witco Isofoam RC-3 spray urethane. It is made of two components mixed together at the time of spraying.

Although other known forms of spray equipment might be used, it is preferred to spray this urethane product by using what is known as Gusmer urethane spray equipment, using especially a Gusmer model "FF" air driven proportioning unit, which is available on the market, with a 490AR resin pump, setting the equipment for a proportion of 60 parts by weight of the "A" component of the urethane chemical mixture to 40 parts of the "B" component of the urethane mixture, and spraying the mixture through a model "D" spray gun.

This foaming urethane mixture is sprayed, as already indicated, below and around and above the steam line 11 and return line 13, filling the space between the steam line and return line and the supporting casing 15 to which the water impervious coating 19 has previously been applied. In addition, the urethane foam 25 is sprayed on top of the steam line 11 and return line 13, to form a rounded body above these lines, approximately as indicated in the drawing, completing as nearly as reasonably possible the circular cross sectional shape or outline of the insulation.

Promptly after the foam solidifies sufficiently, the final coating 27 is applied, over the outside of the upper part of the foamed urethane, this coating 27 being of the same permanently flexible elastomeric waterproofing material which was used for the coating 19 applied to the inside of the lower casing section 15, and it is applied in the same way, that is, preferably by spraying as previously described. It is to be noted that this final coating 27 is extended down at 29 to overlap and make sealing or bonded contact with the previously mentioned portions 21 of the waterproof coating 19 previously applied to the casing 15. Upon completion of the application of this coating 27 over the top of the foamed urethane insulation, it is seen that the entire thermal insulation, both the foamed urethane portion 25 and the fiberglass portion 23, is completely enclosed and encircled by a permanently flexible and elastic waterproof envelope or membrane which, because of its permanent elasticity, maintains its waterproofing integrity even when the base structure to which it is applied develops small cracks, bends, or distortions. Therefore, this is very effective in keeping moisture away from the insulating material, which is a factor of great importance in providing insulating material of high efficiency throughout a long life, with minimum deterioration.

After completion of the final waterproof coating 27, 29, the installation of the replacement insulation is complete. Of course it goes without saying that the steam line and condensate return line must be suitably supported within the trough formed by the casing 15, before and during the application of the sprayed urethane material, and any spacers used for such support can be left in place if desired, or can be removed in succession as the spraying progresses.

What remains to be done, in the typical repair or replacement job, is to backfill the trench which was opened up in order to obtain access to the line which was to be repaired, and this backfilling must be done carefully to avoid any possibility of puncturing the waterproof top coating 27 which was applied over the new insulation 25. According to the invention, this is preferably accomplished as follows.

First, the trench is backfilled by hand, up to an approximately smooth top at the level of the line 31, at or just above the uppermost point or crown of the coating 27. In doing this backfilling by hand, sand or dirt or small gravel is used, avoiding large rocks and especially avoiding any jagged or pointed rocks, so as to eliminate any danger of accidentally puncturing the waterproof coating 27. This hand placed backfill material up to the line 31 is tamped down firmly to provide a smooth surface. Then a protective panel 33 is placed horizontally on the surface 31, this panel being of any suitable protective material which can withstand the severe impact of large rocks and even sharp pointed rocks dropping upon it. A moulded panel of polystyrene material 1' thick is suitable for this purpose, and the panel is wide enough to cover the entire diameter of the installation.

After this protective panel 33 has been put in place, the backfilling proceeds in the normal way, using earth moving equipment to fill the trench, as for example using bulldozers to push dirt into the trench. Even if the material pushed into the trench may include large rocks or rocks with sharp points, the danger of puncturing the waterproof sealing coat 27 is eliminated by the use of the protective layer 33 which in turn is amply supported by the hand tamped filling beneath it.

Approximately the same construction may be used on new jobs, as distinguished from repair or renewal of insulation on old installations. On a new job where a new conduit is being installed and insulated, the same steps, involving the same materials, may be employed, except that the original cylindrical enclosing casing will be absent, and so it need not be longitudinally cut in order to remove the top half. Any suitable structure may be used to form a trough or support for receiving the bottom waterproof coating 19, the supporting structure being either of metal such as Ric-Wil or any other suitable material. From that point onward, the installation in a new job may proceed in the same manner as above described in connection with repair or replacement of old installations.

Although steam distribution lines have been specifically mentioned, and although the invention is particularly advantageous in connection with replacement of deteriorated insulation on steam lines with or without accompanying condensate return lines, it is pointed out that the invention is also useful and may be employed in connection with conduits carrying other materials, wherever thermal insulation is desirable, either in new work or in repair or replacement of old installations.

What is claimed is:

1. The method of replacing deteriorated thermal insulation of a steam conduit running along and within a metal casing of approximately circular cross section extending approximately horizontally and buried beneath the surface of the ground, which comprises the steps of
   (a) excavating a trench sufficiently to expose at least the upper half of said casing
   (b) cutting said casing longitudinally along opposite sides approximately at the mid height thereof, to sever the upper half of the casing from the lower half thereof,
   (c) removing the upper half of the casing
   (d) removing deteriorated insulation from the vicinity of said conduit, including removing all deteriorated insulation from the lower half of said casing,
   (e) thoroughly cleaning the inner face of said lower half of said casing,
   (f) applying a primer coating to the cleaned inner face,
   (g) applying a permanently flexible elastomeric waterproof coating to said inner face of the lower half of said casing over said primer coating,
   (h) applying a layer of preformed thermal insulation material around said conduit,
   (i) applying a filling of foamed insulation material in position to rest on and be supported by said elastomeric waterproof coating and to fill substantially the space between the bottom half of said casing and said conduit and also to form a body extending over and around said conduit and extending up to approximately the original outline of the upper half of the casing,
   (j) applying a permanently flexible elastomeric waterproof coating over the exposed surface of said foamed insulation material and extending such coating to make a sealing connection with the waterproof coating previously applied to the lower half of the casing before the foamed insulation material was applied,
   (k) backfilling the trench approximately to the level of the top of said foamed insulation material while avoiding contact of heavy objects and sharp objects with the waterproof coating applied over the foamed insulation,
   (l) placing a protective panel on such backfill, and
   (m) completing the backfilling of the trench by placing backfill material on top of said protective panel.

2. The method defined in claim 1, wherein said step of cleaning the inner face of the lower half of said casing includes sandblasting said inner face.

3. The method defined in claim 1, wherein said primer coating is an epoxy primer.

4. The method defined in claim 3, wherein said primer coating is applied by spraying.

5. The method defined in claim 1, wherein said waterproof coating applied over said primer coating is a butyl rubber material.

6. The method defined in claim 5, wherein said butyl rubber material is a two component sprayable elastomer sprayed in liquid phase onto said primer coating and cationically polymerizing to form a permanently flexible waterproof membrane.

7. The method defined in claim 1, wherein said preformed thermal insulation material applied around said conduit is of fiberglass.

8. The method defined in claim 1, wherein said foamed insulation material is a urethane foam having a nominal density of approximately three pounds per cubic foot.

9. The method defined in claim 8, wherein said urethane foam is able to withstand a service temperature of about 300 degrees Fahrenheit without serious deterioration, and wherein said thermal insulation applied around said conduit serves to protect said foam from temperatures substantially in excess of 300 degrees Fahrenheit even when said conduit carries fluid at a higher temperature.

10. The method defined in claim 1, wherein said waterproof coating applied over said foamed insulation material is of substantially the same composition as the waterproof coating previously applied over said primer coating.

11. The method defined in claim 1, wherein the step of applying a waterproof coating to the inner face of said casing includes the application of such coating also to the cut top edges of the lower half of said casing and to the outer face of said casing for a short distance downwardly from said top cut edges, to insure an overlapping sealing bond with the waterproof coating subsequently to be applied over said foamed insulation material.

12. The method defined in claim 1, wherein said protective panel is a panel of polystyrene material.

* * * * *